US00RE38306E

(19) United States
(12) Reissued Patent
Fujimori et al.

(10) Patent Number: US RE38,306 E
(45) Date of Reissued Patent: Nov. 11, 2003

(54) PROJECTOR

(75) Inventors: Motoyuki Fujimori, Suwa (JP); Kazuto Shinohara, Suwa (JP); Masashi Kitabayashi, Suwa (JP); Kazuyuki Iinuma, Suwa (JP)

(73) Assignee: Seiko Epson Corporation, Tokyo (JP)

(21) Appl. No.: 10/128,505

(22) Filed: Apr. 24, 2002

Related U.S. Patent Documents

Reissue of:
(64) Patent No.: 6,053,616
Issued: Apr. 25, 2000
Appl. No.: 09/192,415
Filed: Nov. 16, 1998

U.S. Applications:

(63) Continuation of application No. 08/848,027, filed on Apr. 28, 1997, now Pat. No. 5,868,485.

(30) Foreign Application Priority Data

Apr. 26, 1996 (JP) ..... 8-107971
Nov. 15, 1996 (JP) ..... 8-305339

(51) Int. Cl.[7] ..... G03B 21/14
(52) U.S. Cl. ..... 353/119; 353/33
(58) Field of Search ..... 353/31, 33, 81, 353/119, 122

(56) References Cited

U.S. PATENT DOCUMENTS

| | | | | |
|---|---|---|---|---|
| 4,850,685 | A | 7/1989 | Kamakura et al. | 353/34 |
| 5,092,671 | A | 3/1992 | Van Os | 353/31 |
| 5,418,586 | A | 5/1995 | Fujimori et al. | 353/31 |
| 5,455,678 | A | 10/1995 | Loucks | 356/400 |
| 5,605,390 | A | 2/1997 | Brice et al. | 353/119 |
| 5,624,174 | A | 4/1997 | Loucks | 353/122 |
| 5,651,599 | A | 7/1997 | Fujimori et al. | 353/119 |
| 5,653,522 | A | 8/1997 | Loucks | 353/122 |
| 5,749,641 | A | 5/1998 | Brice et al. | 353/119 |
| 5,868,485 | A | 2/1999 | Fujimori et al. | 353/119 |
| 6,053,616 | A * | 4/2000 | Fujimori et al. | 353/119 |

FOREIGN PATENT DOCUMENTS

| | | |
|---|---|---|
| JP | 57-124982 | 8/1982 |
| JP | 60-30424 | 3/1985 |
| JP | 60-117215 | 6/1985 |
| JP | 60-242424 | 12/1985 |
| JP | 61-118707 | 6/1986 |
| JP | 62-47288 | 3/1987 |
| JP | 63-47289 | 3/1987 |
| JP | A-63-10128 | 1/1988 |
| JP | 63-66816 | 5/1988 |
| JP | 63-81481 | 5/1988 |
| JP | 63-90383 | 6/1988 |
| JP | 63-132590 | 6/1988 |
| JP | 63-101985 | 7/1988 |
| JP | 63-131290 | 8/1988 |
| JP | 1-44693 | 2/1989 |
| JP | 64-23185 | 2/1989 |
| JP | 64-23186 | 2/1989 |
| JP | 1-74688 | 5/1989 |
| JP | 1-126869 | 5/1989 |

(List continued on next page.)

*Primary Examiner*—William Dowling
(74) *Attorney, Agent, or Firm*—Oliff & Berridge, PLC

(57) ABSTRACT

A liquid crystal panel unit is attached to a light incident surface of a prism composite. The liquid crystal panel unit includes a panel frame plate holding a liquid crystal panel, and a fixation frame plate glued and fixed to the light incident surface. The panel frame plate is fastened to the fixation frame plate by screws through an intermediate frame plate. By using wedges, the position of the panel frame plate with respect to the light incident surface is adjusted. This allows the liquid crystal panel to be reliably positioned and fixed so that the deviation amount in pixel matching is minimized and the focus adjustment can be accomplished correctly.

37 Claims, 9 Drawing Sheets

FOREIGN PATENT DOCUMENTS

| | | |
|---|---|---|
| JP | 1-105280 | 7/1989 |
| JP | 1-105281 | 7/1989 |
| JP | 1-139284 | 9/1989 |
| JP | 2-10681 | 1/1990 |
| JP | 2-140067 | 5/1990 |
| JP | 2-162881 | 6/1990 |
| JP | 2-85422 | 7/1990 |
| JP | 3-202845 | 9/1991 |
| JP | 3-259691 | 11/1991 |
| JP | 4-86620 | 3/1992 |
| JP | 4-194921 | 7/1992 |
| JP | 4-101579 | 9/1992 |
| JP | 4-45343 | 10/1992 |
| JP | 4-340918 | 11/1992 |
| JP | 5-53516 | 3/1993 |
| JP | 5-33130 | 4/1993 |
| JP | 5-80320 | 4/1993 |
| JP | 5-323257 | 12/1993 |
| JP | A-6-118368 | 4/1994 |
| JP | 6-202193 | 7/1994 |
| JP | A-0634774 | 12/1994 |
| JP | 7-063965 | 3/1995 |
| JP | 8-184797 | 7/1996 |
| JP | 63-97080 | 4/1998 |
| WO | WO 95/12142 | 5/1995 |

* cited by examiner

PROJECTOR

Matter enclosed in heavy brackets [ ] appears in the original patent but forms no part of this reissue specification; matter printed in italics indicates the additions made by reissue.

This is a continuation of Ser. No. 08/848,027 filed Apr. 28, 1997, now U.S. Pat. No. 5,868,485.

BACKGROUND OF THE INVENTION

1. Field of the Invention

The invention relates to a projection type display device which separates a white beam from a light source into beams of three colors, i.e., red, blue and green, modulates each color beam through a light valve such as a liquid crystal panel in accordance with image information, synthesizes the modulated color beams by light synthesizing means, and projects the synthesized beams onto a projection surface through projecting means in an enlarged state. More specifically, the invention relates to a mechanism for mounting a liquid crystal panel to a prism composite constituting a light synthesizing mechanism of a projection type display device.

2. Description of Related Art

In a conventional projection type display device, a liquid crystal panel, serving as a light valve, is mounted to a light incident surface for each light beam of a prism composite. The prism composite is a light synthesizing mechanism. A conventional mechanism for mounting a liquid crystal panel to a prism composite is disclosed in Japanese Unexamined Patent Publication No. 6-118368. In this type of mounting mechanism, the liquid crystal panel, which serves as the light valve, is directly glued and fixed to the light incident surface of the prism composite by an adhesive.

When the light valve is directly glued and fixed to the light incident surface, it is possible to omit the mutual pixel matching mechanism (alignment) of multiple light valves which modulate the light beam separated into red, green and blue colors. It is also possible to omit the focus adjusting mechanism (focus adjustment) so that each image formation plane constituting the subject is positioned within the permissible depth of focus of the projection lens. Thus, it is possible to reduce the size, weight and number of parts of the optical system of the projection device.

However, when the light valve is directly glued and fixed to the light incident surface of the prism composite, several problems may arise. These problems are outlined below.

First, when external light enters the interior of the device, there is a possibility that the external light will enter the light valve. When the light valve receives such light, there is also a possibility of each element of the light valve malfunctioning.

Second, directly touching the light valve while treating the light valve is not desirable since that will lead to problems such as breakage. For example, when the light valve is glued to the prism composite, chucking the light valve directly with a jig may lead to the edge, corner, etc. of the light valve being damaged. Additionally, it is not desirable for the operator to hold the light valve directly by hand and glue it to the prism composite because the light valve, such as a liquid crystal panel, is also vulnerable to static electricity.

Third, the light valve, which is glued to the prism composite, can generate a defect in a part of its pixels as a result of changes with time. When a defect has been generated in the light valve, it is necessary to replace it with a new one. However, since the light valve is glued and fixed to the prism composite, it is difficult to replace only the light valve having the defect. That is, it is not easy to detach the liquid crystal panel glued and fixed to the light incident surface of the prism composite without damaging the light incident surface. For this reason, it is necessary in some cases to also replace the prism composite. The replacement of the prism component, however, is not economical.

SUMMARY OF THE INVENTION

It is an object of the invention to provide a projection type display device equipped with a light valve mounting mechanism capable of solving the above-described problems.

To achieve the above object, the invention is a projection type display device which separates a beam from a light source into a plurality of beams of various colors. The projection type display device modulates each color beam through a light valve in accordance with image information, and thereafter synthesizes the modulated color beams by light synthesizing mechanisms. The projection type display then projects the synthesized beam onto a projection surface, through a projecting mechanism, in an enlarged state. At this point, the periphery of the light valve is protected against the intrusion of external light, damage, etc. By utilizing this type of projection display, it is not necessary for the light valve to be directly glued or otherwise fixed to the light synthesizing mechanism.

In accordance with the invention, the projection type display device includes a fixation frame plate fixed to a light incident surface of the light synthesizing mechanism. The projection type display further includes a light valve frame plate for holding the light valve, a fixing mechanism for detachably fixing the light valve frame plate to the fixation frame plate, and a positioning mechanism for positioning the light valve.

Additionally, at least one of the light valve frame plate and the fixation frame plate includes a peripheral wall covering the periphery of the light valve.

The positioning mechanism may include an adjusting member for adjusting the position of the light valve. In this case, it is desirable for the light valve frame plate to be provided with an adjusting member guiding mechanism.

In order for the adjusting member to be easily handled with a jig or similar mechanism, it is desirable for the adjusting member to be equipped with at least one engagement section. The engagement section will be utilized when chucking the adjusting member.

Further, it is desirable for the positioning mechanism to be provided in the vicinity of the center of opposite side portions of the light valve frame plate. This configuration avoids stress concentrations due to thermal deformation of the member constituting the object of positioning.

In order for the fixation frame plate and the light valve frame plate to be easily handled with a jig or similar mechanism, it is desirable for the fixation frame plate and the light valve frame plate to be equipped with an engagement section for chucking the plates.

In addition to the fixation frame plate and the light valve frame plate, an intermediate frame plate is disposed between the fixation frame plate and the light valve frame plate. In this case, the intermediate frame plate is fixed to the fixation frame plate by the fixing mechanism. The intermediate frame plate is further fixed in a certain position on the light valve frame plate by the positioning mechanism.

In this case, a temporal fixing mechanism is provided for temporarily fixing the intermediate frame plate and the light valve frame plate. It is desirable that the intermediate plate, temporarily fixed by the temporal fixing mechanism and the light valve frame plate, be positioned by the positioning mechanism. This makes it possible to perform the temporal fixing operation in the temporarily fixed state, thereby allowing the positioning operation to be easily performed.

The temporal fixing mechanism may include an engagement protrusion formed on either the intermediate frame plate or the light valve frame plate. An engagement hole will be formed in the plate that does not include the engagement protrusion. In this case, the plates can be temporarily fixed by an adhesive.

Even in the case in which an intermediate plate is provided, the positioning mechanism may include adjusting parts for adjusting the position of the light valve. Further, the light valve frame plate may be provided with an adjusting member guiding mechanism. The adjusting parts may be equipped with at least one engagement section used when chucking the adjusting member. The positioning mechanism may be provided in the vicinity of the center of opposite side portions of the light valve frame plate.

In accordance with the invention, the light valve may be placed between the light valve frame plate and the fixation frame plate.

In accordance with the above-described projection type display device, the light valve is held by the light valve frame plate. Further, the fixation frame plate is fixed to the light incident surface of the light synthesizing mechanism, and the light valve frame plate, holding the light valve, is detachably fixed to the fixation frame plate. This can be accomplished directly or through the use of the intermediate frame plate.

Thus, when a defect is generated in the light valve as a result of change with time, the light valve frame plate holding the light valve is detached from the fixation frame plate which is fixed to the light synthesizing mechanism. At this time, a light valve frame plate which holds a new light valve is mounted to the fixation frame plate. In this way, the light valve is not directly fixed to the light synthesizing mechanism, so that the light valve can be replaced easily. Further, when performing the replacing operation, the surface of the light synthesizing means is not damaged.

In accordance with the projection type display device, the periphery of the light valve is protected by the light valve frame plate. This permits the light value to be mounted to the light synthesizing mechanism without directly touching the light valve. Thus, it is possible to prevent the light valve from being damaged. Further, by using the above configuration, no external light enters the invention which would cause a malfunction, because its periphery is covered with the light valve frame plate.

A liquid crystal device may be used as the above-mentioned light valve. Further, the invention is particularly effective in the case of a liquid crystal device which is vulnerable to static electricity and which may cause a malfunction when external light strikes the liquid crystal device.

Further, the light valve can be classified into a light transmission type and a light reflection type. When a light reflection type light valve is used, the light synthesizing mechanism may also serve as a light separation mechanism for separating a beam from the light source into a plurality of beams of various colors.

Two types of projection type display devices are also contemplated. These projections type display devices include a front surface projection type display device and a back surface projection type display device. The projection of the front surface projection type display device is effected from the side on which the projection surface is observed, and the projection of the back surface projection type display device is effected from the side opposite to the side on which the projection surface is observed. The invention is applicable to both types.

When a dichroic prism is used as the light synthesizing mechanism, the light valve is positioned and fixed to the surface of the dichroic prism by using a fixation frame plate, a light valve frame plate, a fixing mechanism and a positioning mechanism. The fixing structure may be applied to a structure such as a camera in which a solid-state image sensing device such as CCD is positioned and fixed to a color separation prism.

Further objects, details and advantages of the invention will be apparent from the following detailed description, when read in conjunction with the drawings.

DETAILED DESCRIPTION OF THE PREFERRED EMBODIMENTS

Overall Construction of the Device

Figure 1:
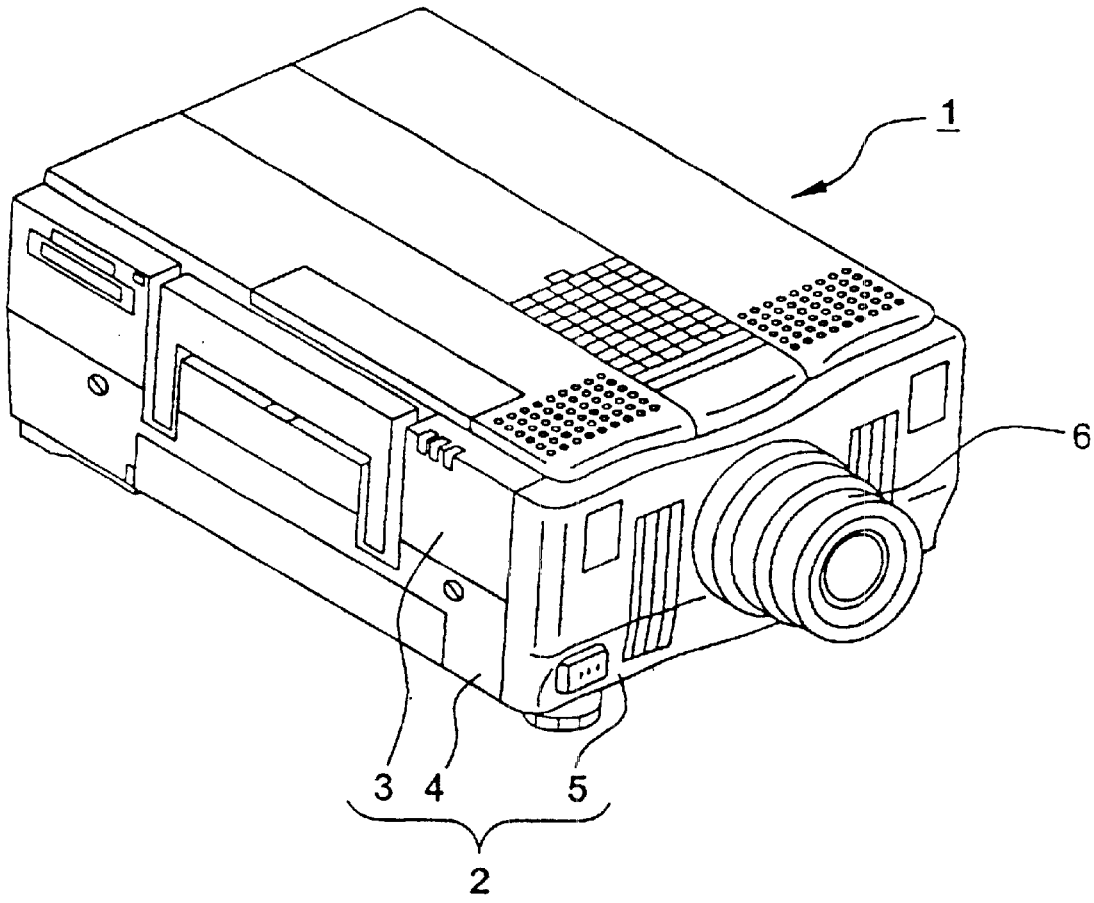
FIG. 1 is a perspective view showing a projection type display device in accordance with the invention.

FIG. 1 shows a perspective view of a projection type display device 1. The projection type display device 1 of this example has a substantially rectangular parallelopiped case 2. The case 2 basically includes an upper case 3, a lower case 4 and a front case 5 defining a front face of the device. The forward end portion of a projection lens unit 6 protrudes from the center of the front case 5.

Figure 2A:
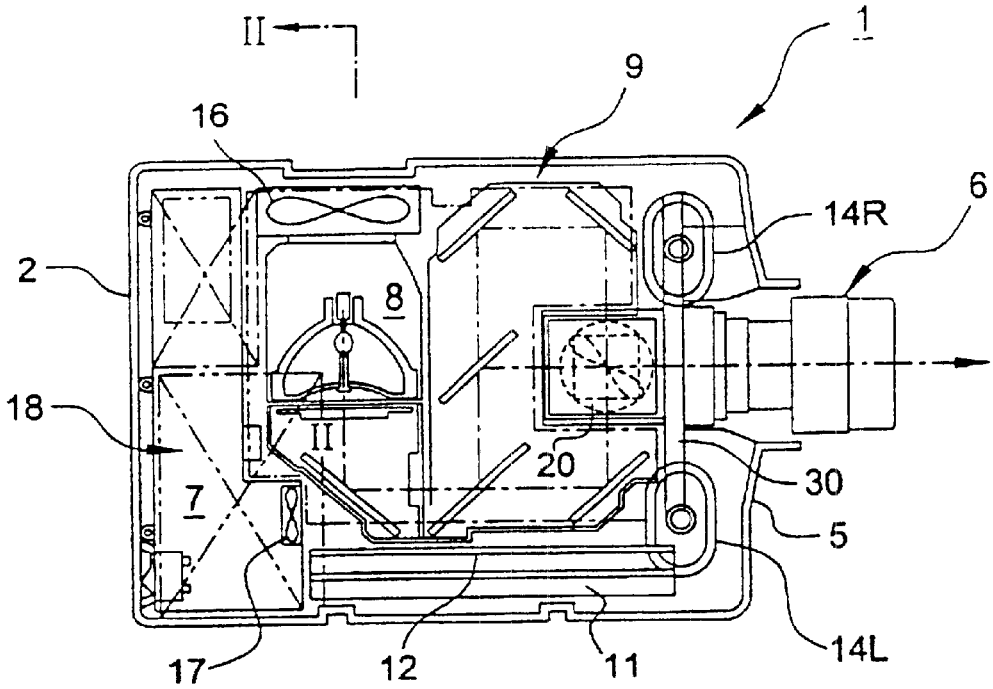
FIG. 2(A) is an elevational view of components in the interior of the device of FIG. 1.
Figure 2B:
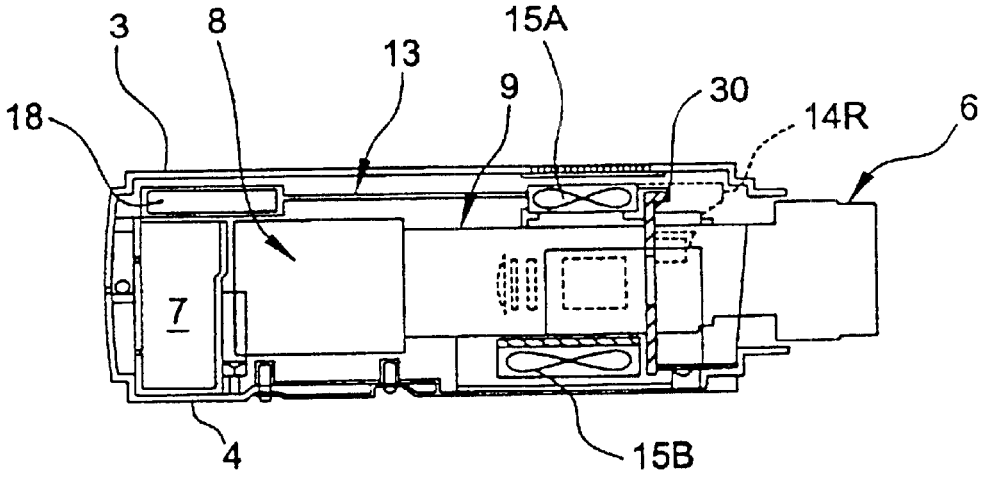
FIG. 2(B) shows an elevational view of the components of the device.

FIG. 2 shows the arrangement of components inside the case 2 of the projection type display device 1. As shown, a power source unit 7 is located at the rear end of the interior of the case 2. A light source lamp unit 8 and an optical unit 9 are located proximate the front side of the case 2. A base end of a projection lens unit 6 is located at the center of the front side of the optical unit 9. An interface board 11 is disposed on one side of the optical unit 9. The interface board 11 has an input/output interface circuit mounted thereon. The interface board 11 is arranged to extend in the longitudinal direction of the device. A video board is disposed parallel to the interface board. A video signal processing circuit is mounted on the video board. A control board 13, for device drive control, is placed above the light source lamp unit 8 and the optical unit 9. Speakers 14R and 14L are located in the right and left corners of the front side of the device, respectively.

An intake fan 15A for cooling is located at the center of the upper side of the optical unit 9. A circulation fan 15B is located at the center of the bottom side of the optical unit 9. The circulation fan 15B forms a circulation flow for cooling the device. An air discharge fan 16 is substantially behind the light source lamp unit 8. Proximate to the power source unit 7 and facing the ends of the boards 11 and 12, is an auxiliary cooling fan 17 for sucking the cooling air flow from the intake fan 15A into the power source unit 7. Directly above the power source unit 7 is a floppy disk driving unit 18. In the preferred embodiment, the power source unit is positioned on the left side of the device.

Optical Unit and Optical System

Figure 3A:
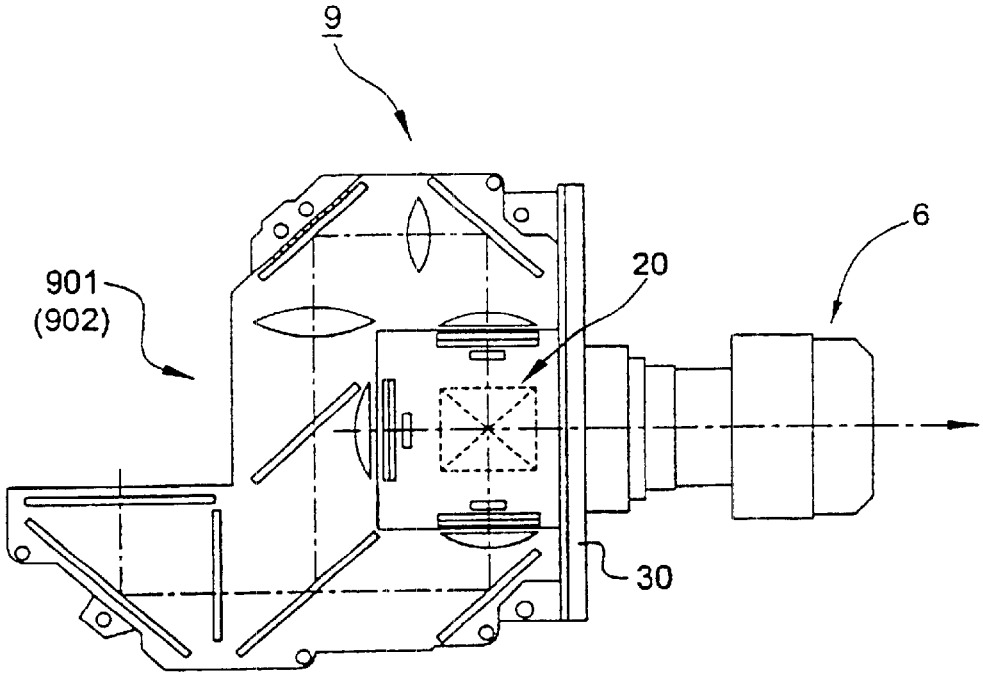
FIG. 3(A) shows an optical unit and a projection lens unit.

FIG. 3(A) shows a portion of the device corresponding to the optical unit 9. As shown in FIG. 3(A), the optical unit 9 has optical elements including a prism unit 20. The optical elements, which constitute its color synthesizing mechanism 15, are placed between upper and lower light guides 901 and 902. The upper and lower light guides 901 and 902 are fixed to the upper case 3 and the lower case 4 by fixing screws, respectively. The upper and lower light guides 901 and 902 are fixed to the side of the prism unit 20 by fixing screws.

The prism unit 20 is fixed to the back side of a thick head plate 30 by fixing screws. In the preferred embodiment, the thick head plate 30 is a die-cast plate. The base side of the projection lens unit 6 is fixed to the front side of this head plate 30 by fixing screws. The projection lens unit 6 serves as the projection mechanism. Thus, in this example, the prism unit 20 and the projection lens unit 6 are fixed together with the head plate 30 therebetween. Thus, even if an impact is applied to the side of the projection lens unit 6, no positional deviation is generated in these two components.

Figure 3B:
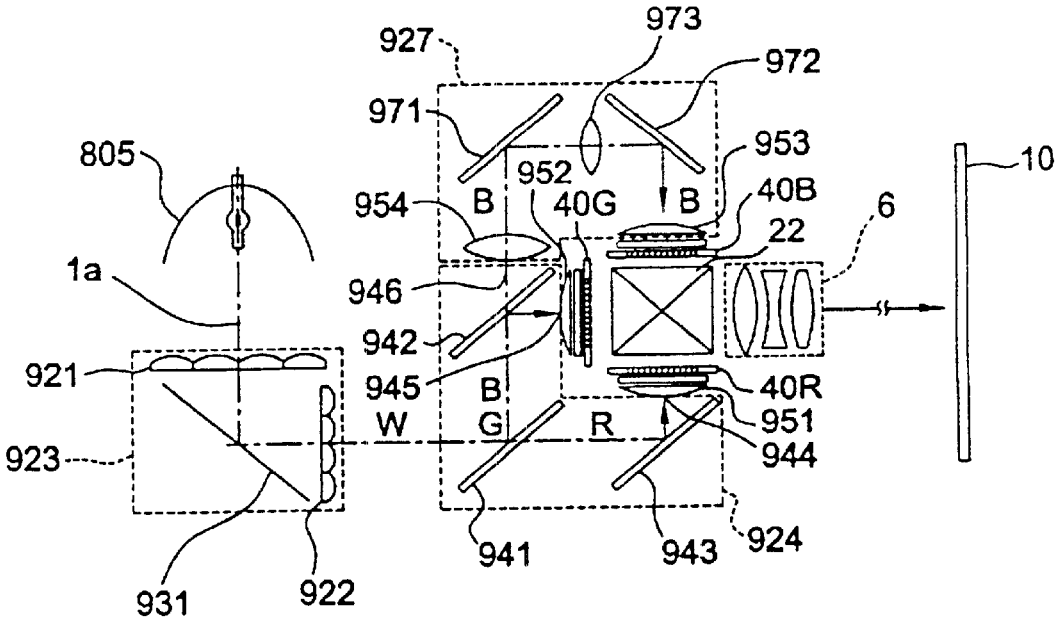
FIG. 3(B) is a schematic showing the optical system.

FIG. 3(B) schematically shows the optical system of the projection type display device 1. The optical system of this example includes a light source lamp 805 and an illumination optical system 923. The illumination optical system 923 includes integrator lenses 921 and 922. The integrator lenses 921 and 922 are uniform illumination optical elements. A color separation optical system 924 for separating a white beam W output from the illumination optical system 923 into color beams of red, green and blue, i.e., R, G and B, respectively, is also provided. The optical system further includes three liquid crystal panels 40R, 40G and 40B, which serve as light valves for modulating the color beams, and a prism composite 20. The prism composite 20 serves as a color synthesizing optical system for synthesizing the modulated color beams. Additionally, a projection lens unit 6, for projecting the synthesized beam onto a projection surface 7 in an enlarged state, is also provided. A light guide system 927 for guiding the blue color beam B of the color beams separated by the color separation optical system 924 to the corresponding liquid crystal panel 40B is also provided.

The light source lamp 805 may include a halogen lamp, a metal halide lamp, a xenon lamp or other light sources. The uniform illumination optical system 923 is equipped with a reflection mirror 931. The reflection mirror 931 bends the optical axis 1a of the beam output from the illumination optical system by 90°. This allows the output to be generated towards the forward portion of the device. The integrator lenses 921 and 922 are arranged so as to be orthogonal to each other with the reflection mirror 931 placed therebetween.

The color separation optical system 924 includes a blue/green reflection dichroic mirror 941, a green reflection dichroic mirror 942 and a reflection mirror 943. The blue beam B and the green beam G, contained in the white beam W, are reflected at right angles by the blue/green reflection dichroic mirror 941 and directed toward the green reflection dichroic mirror 942. The red beam R is transmitted through the blue/green reflection dichroic mirror 941 and reflected at a right angle by the reflection mirror 943. The red beam R is then reflected to the prism composite 20 from an output section 944 for the red beam. Only the green beam G is reflected at right angles by the green reflection dichroic mirror 942 and output to the color synthesizing optical system from an output section 945 for the green beam. The blue beam B, which is transmitted through the green reflection dichroic mirror 942, is output to the light guide system from an output section 946 for the blue beam. In this example, the distances from the output section for the white beam of the uniform illumination optical elements to the output sections 944, 945 and 946 for the color beams in the color separation system 924 are all set to the same distance.

Condenser lenses 951 and 952 are arranged on the output sides of the output sections 944 and 945 for the color beams of the color separation system 924, respectively. Thus, the color beams output from the output sections incident upon these condenser lenses 951 and 952 are turned into parallel beams. The parallel color beams R and G, which are incident upon the liquid crystal panels 40R and 40G, are then modulated. Thereafter, image information corresponding to each color beam is added thereto. That is, the liquid crystal panels 40R and 40G undergo switching control in response to image signals corresponding to image information. This is accomplished by a driving mechanism (not shown), whereby the color beams passing therethrough are modulated. Any known driving mechanism may be used.

The blue beam B is guided to the corresponding liquid crystal panel 40B through the light guide system 927. The blue beam B is similarly modulated in accordance with image information. The liquid crystal panels 40R, 40G and 40B used in this example may include, for example, polysilicon-TFT used as switching elements.

The light guide system 927 has an input side lens 954, an input side reflection mirror 971, an output side reflection mirror 972, an intermediate lens 973, and the condenser lens 953. The intermediate lens 973 is located between the input side reflection mirror 971 and the output side reflection mirror 972. The condensor lens 953 is located in front of the liquid crystal panel 40B. The blue beam B has the longest optical path length of the color beams, i.e., the distance from the light source lamp 805 to the respective liquid crystal panel. Thus, the light quantity loss of the blue beam B is the greatest. However, the light quantity loss can be restrained due to the light guide system 927. Thus, it is possible to make the optical path lengths of the color beams substantially equivalent to each other.

Next, the color beams are modulated by passing through the liquid crystal panels 40R, 40G and 40B incident upon the prism composite 22, at which time they are synthesized. In this example, the prism composite 22 that includes a dichroic prism is used to form the color synthesizing optical system. Color images synthesized at this point are projected in an enlarged state onto a projection surface 7, which is disposed at a predetermined position. This is accomplished utilizing the projection lens unit 6.

Construction of Prism Unit and Head Plate

Figure 4:
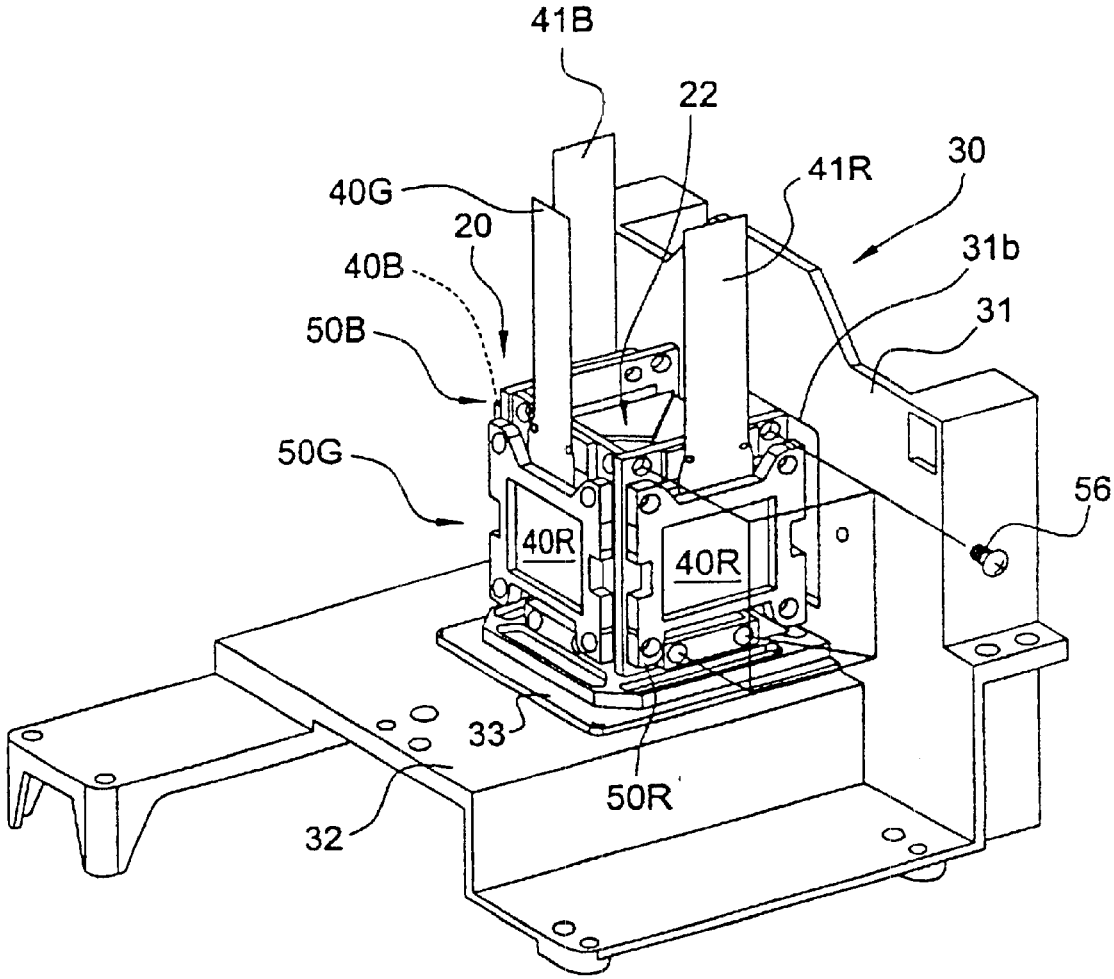
FIG. 4 is a partial perspective view showing a head plate, a prism unit and a liquid crystal panel unit.

FIG. 4 shows a head plate 30. Attached to the head plate 30 is the prism unit 20. The head plate 30 includes a widthwise vertical wall 31 and a horizontal bottom wall 32 extending from the lower end of the vertical wall 31. The vertical wall 31 has a rectangular opening 31b through which the output beam from the prism unit 20 is transmitted. A number of reinforcing ribs are formed on the vertical wall 31 to enhance its rigidity. The prism unit 20 and the projection lens unit 6 are aligned and secured in position with the vertical wall 31 placed therebetween (See FIG. 3(A)). These components are firmly connected, thus eliminating the possibility that a mutual positional deviation can occur, even if an impact or similar operation is applied to them.

The prism unit 20 is disposed on the upper surface of bottom wall 32 of the head plate 30. The prism unit 20 is equipped with a rectangular parallelopiped prism composite 22 formed by joining together the slant faces of four prisms 21 and a prism support plate 33. Each of the four prisms 21 have a right-angled isosceles triangle (See FIG. 5) sectional configuration. The bottom portion of the prism composite 22 is fixed to the surface of the prism support plate 33 by adhesion or the like. The prism support plate 33 is mounted on and fixed to the bottom wall 32 of the head plate. Liquid crystal panel units 50R, 50G and 50B, of the same construction, are mounted to the three side surfaces of the side surfaces of the prism composite 22. The side surfaces function as light incident surfaces. Liquid crystal panels 40R, 40G and 40B are held by the liquid crystal panel units 50R, 50G and 50B, respectively.

Liquid Crystal Panel Mounting Structure

Figure 5:
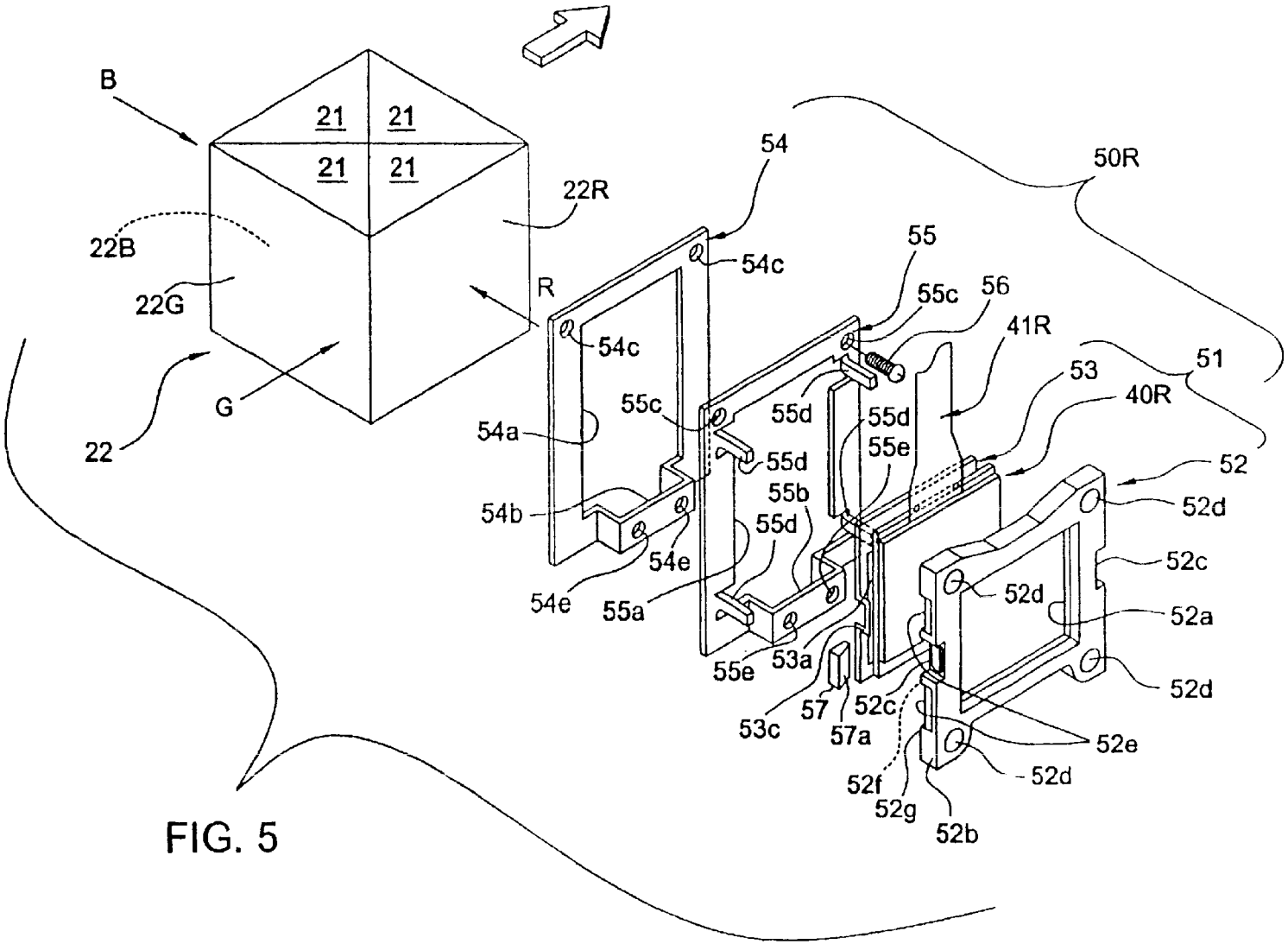
FIG. 5 is an exploded perspective view of the liquid crystal panel unit of FIG. 4.

FIG. 5 is an exploded view showing components of the liquid crystal panel unit 50R. The liquid crystal panel unit 50R holds the liquid crystal panel 40R. FIG. 5 shows the mounting structure for mounting the liquid crystal panel 40R to the prism composite 22.

As shown in FIG. 5, the liquid crystal panel unit 50R is equipped with a panel frame plate 51 for holding the liquid crystal panel 40R. The panel frame plate 51 includes a first frame plate 52 and a second frame plate 53. The liquid crystal panel 40R is held between frame plates 52 and 53.

The liquid crystal panel unit 50R is further equipped with a fixation frame plate 54 which is glued or otherwise fixed to the light incident surface 22R of the prism composite 22. The panel frame plate 51 is detachably attached to a side of the fixation frame plate 54 by an intermediate plate 55.

The panel frame plate 51 includes a first frame plate 52. The first frame plate 52 is equipped with a rectangular opening 52a for transmitting light and a peripheral wall 52b with a uniform thickness. The second frame plate 53 also has a rectangular opening 53a for transmitting light. The size of the second frame plate 53 is slightly smaller than the first frame plate 51, thus allowing it to be fitted in the inner side of the peripheral wall 52b. An engagement protrusion 53c is formed at the center of each of the right and left edges of the second frame plate 53. An engagement groove 52c, in which the engagement protrusion 53c is fitted, is formed at the center of each of the right and left outer sides of the peripheral wall 52b. The panel frame body 51 is formed when the first and second frame plates 52 and 53 are superimposed upon one another. The liquid crystal panel 40R is placed therebetween. At this time, the engagement protrusions 53c are fitted into the engagement grooves 52c. The liquid crystal panel 40R sits between the frame plates 52 and 53.

An intermediate frame plate 55 is a rectangular frame substantially the same size as, or slightly larger than, the first frame plate 52. The intermediate frame plate 55 is equipped with a rectangular opening 55a for transmitting light. Engagement protrusions 55d extend perpendicularly from the surface of the frame plate 55, and are proximate to the four corners of the rectangular opening 55a of the intermediate frame plate 55. The first frame plate 52 of the panel frame plate 51 has engagement holes 52d corresponding to the engagement protrusions 55d. The engagement protrusions can be inserted into the engagement holes 52d. A temporarily fixed condition is accomplished when the panel frame plate 51 and the intermediate frame plate 55 are superimposed upon one another with the engagement holes 52d and the engagement protrusions 55b being engaged. It is at this time that the engagement protrusions 55d are inserted into the engagement holes 52d.

The fixation frame plate 54 is also a rectangular frame plate having a rectangular opening 54a for transmitting light. The back surface of the fixation frame plate 54 is fixed to the light incident surface 22R of the prism composite 22 by an adhesive. Screw holes 54c are formed in the right and left upper corners of the fixation frame plate 54. Screw holes 55c corresponding to the screw holes 54c are formed in the intermediate frame plate 55.

A protruding frame 54b that protrudes toward the intermediate frame plate 55 is formed in the lower frame section of the fixation frame plate 54. A protruding frame 55b, into which the protruding frame 54b is to be fitted from the back side, is formed in the lower frame section of the intermediate frame plate 55. The panel frame plate 51 is held by being placed on the protruding frames 54b and 55b. The protruding frames 54b and 55b have right and left screw holes 54e and 55e.

In this way, screw holes 54c, 54e and 55c, 55e are formed at mutually corresponding positions of the fixation frame plate 54 and the intermediate frame plate 55. These frame plates are fastened together by four flat countersunk head screws 56, one of which is shown in FIG. 5, which are threadedly engaged with the corresponding screw holes. That is, the intermediate frame plate 55 is screwed to the fixation frame plate 54 and glued to the prism composite 22.

The liquid crystal panel unit 50R is equipped with four wedges 57 serving as a positioning mechanism. FIG. 5 shows only one of these wedges. Wedge guide surfaces 52e are formed in the right and left sections of the peripheral wall of the first frame plate 52 of the panel frame plate 51. After temporarily fixing the panel frame plate 51 to the intermediate frame plate 55, the four wedges 57 are inserted into the right and left sides of the first frame plate 52. The insertion depth of these wedges 57 is adjusted, so that the liquid crystal panel 40R can be adjusted.

The liquid crystal panel unit 50R is mounted to the light incident surface 22R of the prism composite 22. This mounting is accomplished by first preparing the panel frame plate 51 holding the liquid crystal panel 40R. Next, the fixation frame plate 54 is positioned on the face 22R of the prism composite 22 and is glued and fixed thereto. The adhesive used may be an ultraviolet setting type adhesive or similar adhesive. Thereafter, the intermediate frame plate 55 is positioned on the surface of the fixation frame plate 54.

The intermediate frame plate 55 is then glued and fastened thereto by the four screws 56. After this, the panel frame plate 51 holding the liquid crystal panel 40R is positioned on the intermediate frame plate 55 and temporarily fixed thereto. That is, the engagement protrusions 55d of the intermediate frame plate 55 is aligned with respect to the engagement holes 52d of the panel frame plate 51. After alignment, the panel frame plate 51 is pushed toward the intermediate frame plate 55. It becomes easier to achieve a high level of positional accuracy when the fixation frame plate 54 and the intermediate frame plate 55 are connected to each other by the screws 56 before gluing and fixing the fixation frame plate 54 to the prism composite 22.

After this, the liquid crystal panel 40R is positioned with respect to the face 22R of the prism composite 22 by using wedges 57. The wedges 57 serve as a positioning mechanism. That is, the four wedges 57 are inserted into a gap between the panel frame plate 51 and the intermediate frame plate 55. The wedges are temporarily fixed to each other along the wedge guide surfaces 52e formed on the first frame plate 52. Then, by adjusting the insertion amount of the wedges 57, the alignment and focus adjustment of the liquid crystal panel 40R are accomplished.

When the positioning has been achieved, the wedges 57 are glued and fixed to the panel frame plate 51 and the intermediate frame plate 55, which is the object of positioning, by using an adhesive. The adhesive used may be an ultraviolet setting type adhesive.

The positioning of the wedges 57 and the gluing and fixing of the wedges 57 is described in more detail. First, the focusing plane of the liquid crystal panel 40G is set in the focusing plane of the projection lens 6 by using a dedicated adjusting device. In this condition, the engagement protrusions 55d of the intermediate plate 55 are inserted into the engagement holes 52d of the light valve frame plate 51. This defines a gap into which an ultraviolet setting type adhesive is injected. Temporal fixation is caused by ultraviolet radiation. Next, ultraviolet radiation is used on the ultraviolet setting type adhesive from the exposed end surfaces of the wedges 57 to cause final fixation. This is performed near the intermediate frame plate 55 and the wedge guide surfaces 52e formed on the first frame plate 52. By using the liquid crystal panel 40G arranged at the center of the liquid crystal panels 40G, 40R and 40B as a reference, focusing adjustment and mutual pixel matching adjustment are accomplished on the liquid crystal panels 40R and 40B. Temporal fixation and final fixation are then accomplished.

Since the temporal fixation is performed by setting the components in an adjusting device, with the prism composite 22 and the projection lens 6 mounted on the head plate 30, an optimum adjustment adapted to the characteristics of each component is possible. Further, the chucking of the light valve frame plate 51 in the adjusting device is conducted by using the outer configuration of the first frame plate 52a.

The liquid crystal panel units 50G and 50B holding the liquid crystal panels 40G and 40B have the same structure as liquid crystal plan unit 50R. Thus, a description of liquid crystal panel units 50G and 50B is omitted.

In this way, the liquid crystal panel units 50R, 50G and 50B are attached to the three surfaces 22R, 22B and 22G of the prism composite 22, respectively. This results in the structure shown in FIG. 4. In FIG. 4, the components extending upwards from the liquid crystal panel units 50R, 50G and 50B are flexible cables 41R, 41G and 41B, respectively, for wiring.

The liquid crystal panel unit 50R described above provides several advantages. First, the periphery of the liquid crystal panel 40R is covered with and protected by the rectangular panel frame plate 51. Thus, there is no need to directly touch the liquid crystal panel 40R when mounting it to the prism composite 22. As a result, it is possible to prevent the liquid crystal panel from being touched by other parts, thereby eliminating the possibility of breakage or damage. Further, since the periphery of the liquid crystal panel 40R is covered with the frame plate 51, it is possible to intercept external light. Thus, even if external light is allowed to intrude, no malfunction occurs in the liquid crystal panel 40.

Second, the panel frame plate 51, holding the liquid crystal panel 40R, is detachably fastened by screws to the face 22R of the prism composite 22 through the intermediate frame plate 55. Thus, when a defect is generated in the liquid crystal panel 40R, it can be replaced by simply detaching the screws 56. Further, since the liquid crystal panel 40R is not directly glued or otherwise fixed to the prism composite 22, there is no concern that the sides of the prism composite 22 will be damaged. Thus, it is possible to use expensive parts without wasting them.

Third, the panel frame member 51 holding the liquid crystal panel 40R can be temporarily fixed to the intermediate frame plate 55. After achieving the temporarily fixed state, the liquid crystal panel 40R can be positioned with respect to the face 22R of the prism composite 22. In this way, a temporarily fixed state is accomplished so that the positioning operation using the wedges 57 is easily conducted. Due to this advantage, improvement can be achieved in terms of the cycle time of the equipment.

Here, the wedges 57 may generally be formed of glass. However, when the first frame plate 52 is formed of a resin, its coefficient of thermal expansion is larger than that of glass. Due to the difference in thermal expansion, the wedges 57 may separate from the frame plates or be damaged as a result of changes in temperature. To avoid this, it is desirable for the wedges 57 to be formed of a resin, such as an acrylic resin. By forming the wedges 57 of an acrylic material, molding is also possible. This substantially reduces the costs as compared to the case in which glass material is used. Additionally, by using a material which allows transmission of ultraviolet rays as the material of the wedges 57, it is possible to use an ultraviolet setting type adhesive. This process involves a minimal rise in temperature and requires a short time for curing.

Further, as a result of the formation of the wedge guide surfaces 52e on the first frame plate 52, upper and lower end surfaces 52f and 52g are formed. The wedges 57 are guided by these three surfaces. That is, when this portion is filled with adhesive and then the wedge 57 is inserted, the wedge 57 is automatically led to the interior while being guided by these three surfaces. This is mainly due to the surface tension of the adhesive. Thus, an improvement is achieved in terms of resistance to disturbances experienced during the process as well as facilitating the mounting of the wedges 57.

While in this example an adhesive is used for the temporal fixation of the panel frame plate 51 to the intermediate frame plate 55, soldering or a similar technique can be used for this purpose. When the first frame plate 52, etc. are formed of resin, a metal member may be attached to the joint section of engagement holes 52d and engagement protrusions 55d. Alternatively, a metalization layer may be formed in the joint section of engagement holes 52d and engagement protrusions 55d.

Next, the first frame plate 52, the intermediate frame plate 55 and the fixation frame plate 54 may include a molded product of a thermosetting resin mixed with glass fiber or calcium carbonate. When such a resin material is used, its coefficient of thermal expansion becomes closer to that of glass as compared with ordinary resin materials. Thus, in the condition in which it is attached to the prism composite 22, pixel deviation or similar problems attributable to thermal deformation can be avoided.

While it is possible, as described above, to use an ultraviolet setting type adhesive as the adhesive for gluing and fixing the fixation frame plate 54 to the prism composite 22, it is desirable to apply a ground surface processing material to achieve a higher level of adhesiveness. That is, in the prism composite 22, the incident surface 22R for the red beam and the incident surface 22B for the blue beam are opposed to each other, as described above. A part of the blue beam may be transmitted through the reflection layer of the prism composite 22 to reach the incident surface 22R for the red beam on the opposite side. A malfunction may occur when such a transmitted beam is allowed to incident upon the liquid crystal panel 40R. To avoid this malfunction, a filter is attached to the incident surface 22R for the red beam to intercept such transmitted beam.

A filter is only attached to the incident surface 22R for the red beam because the influence of the transmitted beam of the blue beam, which has the shortest wavelength among three color beams, is the most significant. When the influence of such a transmitted beam of some other color beam is significant, a filter may be provided on a surface other than the surface 22R, or a plurality of filters may be provided on a plurality of surfaces.

However, when such a filter exists, the ultraviolet radiation applied at the time of gluing and fixing may be intercepted. This may result in some portions of the ultraviolet setting type adhesive for gluing and fixing the fixation frame plates 54 to the incident surfaces 22R, 22G and 22B of the prism composite 22 not being sufficiently irradiated with ultraviolet rays. To avoid this problem and reliably glue or otherwise fix the fixation frame plate 54 to the incident surface 22R, it is desirable, as described above, to apply a ground surface processing material to these adhesion surfaces preferably using an anaerobic type adhesive. A is similar processing can occur without a filter.

While in the above description an ultraviolet setting type adhesive is used, it is also possible to use other types of adhesives. For example, when a hot-melt type adhesive is used for the gluing and fixation of the fixation frame plate 54 and the wedges 57, there is no need to take into account the above problem due to the filter.

First Modification of the Liquid Crystal Panel Unit

Figure 6:
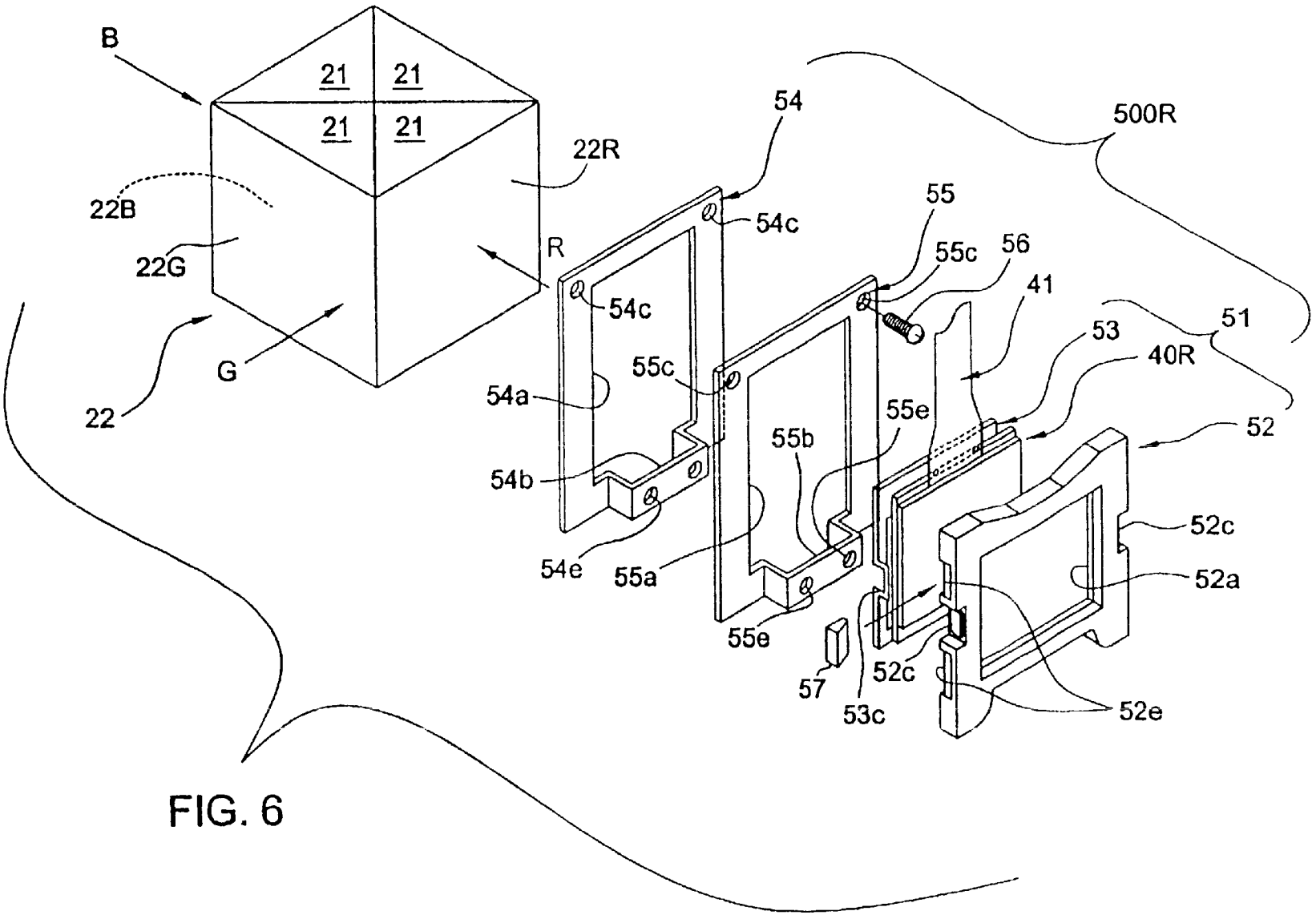
FIG. 6 is an exploded perspective view of a first modification of the liquid crystal panel unit of FIG. 5.

As shown in FIG. 6, when there is no need to temporarily fix the panel frame member 51 to the intermediate frame plate 55, the temporal fixation mechanism formed between the panel frame member 51 and the intermediate frame plate 55 can be omitted. That is, the engagement holes 52d formed on the panel frame plate 51 side and the engagement protrusions 55d formed on the intermediate frame plate 55 side can be omitted. In this case, the panel frame member 51 is fixed to the intermediate frame member 55 solely by the wedges 57.

Also, when a liquid crystal panel unit 500R as shown in FIG. 6 is used, it is possible to obtain the above first and second effects achieved by the liquid crystal panel 50R. Further, it is effective in reducing the size of the prism unit 20.

Second Modification of the Liquid Crystal Panel Unit

Figure 7:
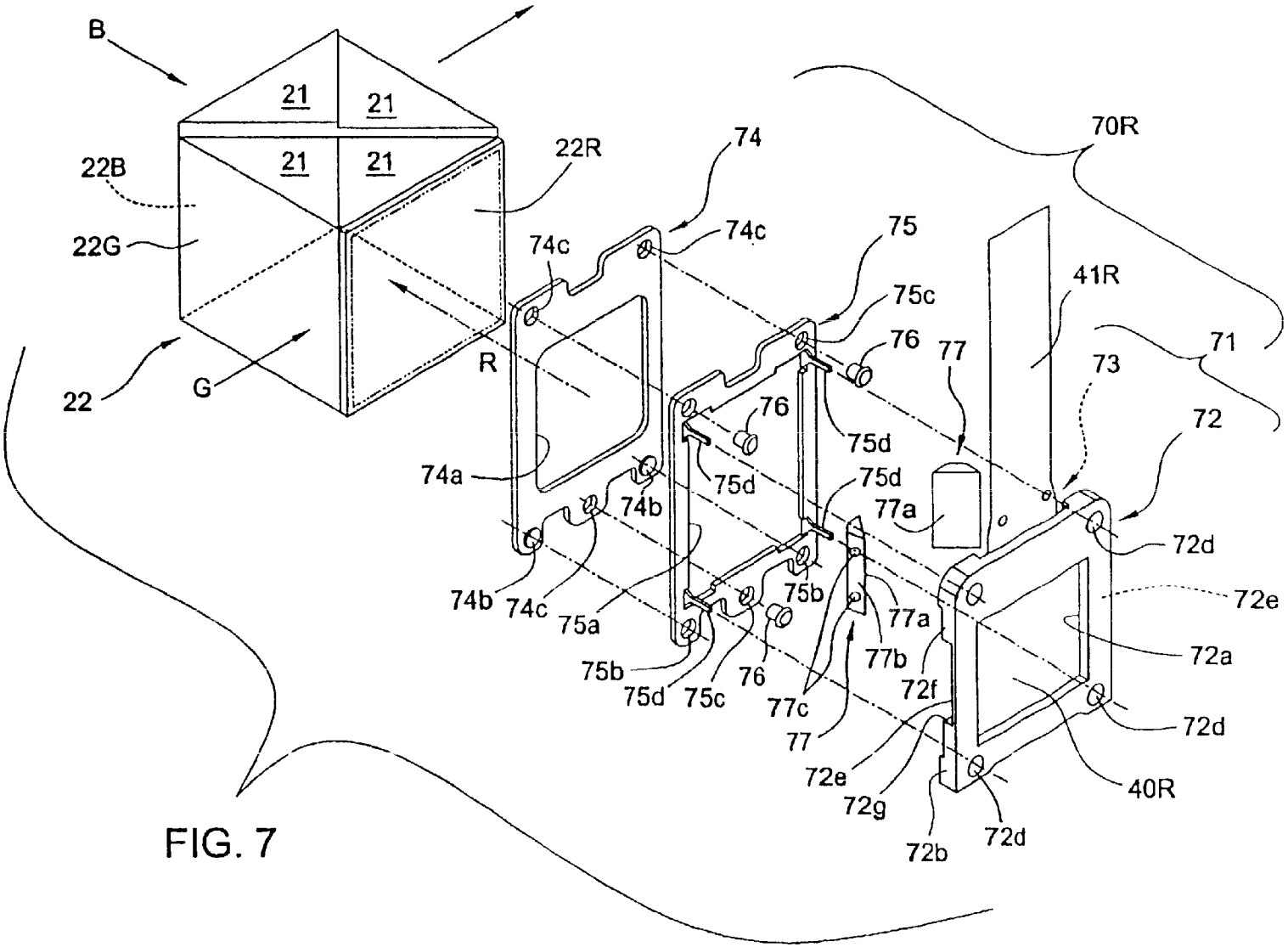
FIG. 7 is an exploded perspective view of a second modification of the liquid crystal panel unit of FIG. 5.

FIG. 7 is an exploded view of a liquid crystal panel unit 70R according to a second modification of the liquid crystal panel unit 50R. The components corresponding to those of the liquid crystal panel unit 50R shown in FIG. 5 are indicated by the same reference numerals, and a description thereof is omitted.

As shown in FIG. 7, the liquid crystal panel unit 70R is equipped with a panel frame plate 71 for holding the liquid crystal panel 40R. Like the panel frame plate 51 of the liquid crystal panel unit 50R, this panel frame plate 71 is equipped with first and second frame plates 72 and 73. The liquid crystal panel 40R is placed and held between these frame plates. FIG. 7 only shows the first frame plate 72. The second frame plate 73 and the liquid crystal panel unit 40R are already mounted and fixed to the first frame plate 72 side. The liquid crystal panel unit 70R is further equipped with a fixation frame plate 74 glued and fixed to the light incident surface 22R of the prism composite 22. The panel frame plate 71 is detachably attached to this fixation frame plate 74 by an intermediate frame plate 75.

The panel frame plate 71 is similar to the above-described panel frame plate 51 of the liquid crystal panel unit 50R. The first frame plate 72 is equipped with a rectangular opening 72a for transmitting light and a peripheral wall 72b having a fixed thickness. The second frame plate 73 also has a rectangular opening (not shown) for transmitting light. The size of this second frame plate 73 allows it to be fitted into the inner side of the peripheral wall 72b. Thus, the panel frame plate 71 is formed when the second frame plate 73 is fitted into the first frame plate 72 with the liquid crystal panel 40R being placed between the first and second frame plates 72 and 73. In this configuration, the liquid crystal panel 40R is held between the frame plates 72 and 73.

The fitting structure for the first frame plate 72 and the second frame plate 73 is substantially similar to the first and second frame plates 52 and 53 of the panel frame plate 51 shown in FIG. 5. However, in the case of this example, hooks and engagement grooves, to be engaged with the hooks, are formed at upper and lower positions with guide grooves 72e–72g of the first frame plate 72 therebetween. These sections are omitted in the drawing.

The intermediate frame plate 75 is substantially the same size as the first frame plate 72 of the panel frame plate 71. The intermediate frame plate is equipped with a rectangular opening 75a for transmitting light. The intermediate frame plate 75 includes a rectangular opening 75a having four corners. Engagement protrusions 75d extending perpendicularly from the surface of the frame plate are contemplated proximate to each of the four corners. At the corresponding positions on the first frame plate 72 of the panel frame plate 71, are engagement holes 72d into which these engagement protrusions are inserted. The engagement holes 72d engage the engagement protrusions 75b when the panel frame plate 71 and the intermediate frame plate 75 are superimposed upon one another. A temporarily fixed state is achieved at this time.

The fixation frame plate 74 is also a rectangular frame plate having a rectangular opening 74a for transmitting light. The back side of the fixation frame plate 74 is fixed to the light incident surface 22R of the prism composite 22 by means of an adhesive. Screw holes 74c are formed in both corners of the upper frame portion of the fixation frame plate 74 and at the center with respect to the horizontal direction of the lower frame portion of the fixation frame plate 74. Screw holes 75c corresponding to three screw holes 74c are formed in the intermediate frame plate 75. The intermediate frame plate 75 is fastened to the fixation frame plate 74 by fastening flat countersunk head screws 76 into the corresponding screw holes 74c and 75c. In this example, the intermediate frame plate 75 is fixed to the fixation frame plate 74 by three screws 76. The number of screws may be four, as shown in FIG. 5. Alternatively, more than 5 screws may also be used. Generally, the smaller the number of screws, the smaller the number of screwing processes.

Engagement protrusions 74 are formed in the right and left corners of the lower frame portion of the fixation frame plate 74. Engagement holes 75b corresponding to the two engagement protrusions 74b are formed in the corresponding right and left corners of the lower frame portion of the intermediate frame plate 75. Thus, the engagement holes 75b of the intermediate frame plate 75 are matched with the engagement protrusions 74b of the fixation frame plate 74. The intermediate frame plate 75 is also pushed toward the fixation frame plate 74, whereby the intermediate frame plate 75 can be temporarily attached to the fixation frame plate 74. This makes it possible to further improve the positioning accuracy for these frame plates.

The liquid crystal panel unit 70R of this embodiment is also equipped with a positioning mechanism. The positioning mechanism positions the panel frame plate 71 with respect to the intermediate frame plate 75 which is also fixed to the fixation frame plate 74. This positioning mechanism is equipped with two wedges 77. Guide surfaces 72e–72g, against which the slant faces of the wedges 77 abut, are formed at the center with respect to the vertical dimension of the right and left side surfaces of the peripheral wall 72a of the first frame plate 72 of the panel frame plate 71. When the panel frame plate 71 is temporarily fixed to the intermediate frame plate 75, wedge insertion grooves are formed between the wedge guide grooves 72e of the first frame plate 72 and the frame portion of the intermediate frame plate 75 opposite thereto. Thus, after temporarily fixing the panel frame plate 71 to the intermediate frame plate 75, the two wedges 77 are fitted into the right and left sides of the first frame plate 72. The insertion amount of each of these wedges 77 is adjustable, to position the liquid crystal panel 40R. The process for forming the prism unit 20 is the same as that in the above-described example, so that a description thereof is omitted.

The liquid crystal panel unit 70R as described above also provides the same effect as the liquid crystal panel unit 50 shown in FIG. 5.

Further, unlike the cases shown in FIGS. 5 and 6, this example adopts frame plates having a flat configuration as the fixation frame plate 74 and the intermediate frame plate 75. As described with reference to FIG. 2(B), a fan 15B is arranged underneath the prism composite 22 and cooling air flows upwards from below. To prevent disturbance of this air flow, it is desirable to arrange a flow regulating plate at a position above the fan 15B. Since the fixation plate 74 and the intermediate frame plate 75 are flat plates, it is possible to extend the mounting position for the flow regulating plate to a position directly below the liquid crystal panel 70R. Thus, it is possible to effectively cause the cooling air to flow from below towards the upward portion of the device. Further, since the configuration of these frame plates is simple, the machining of the parts is easy to accomplish. This, in turn, provides for an improvement in parts accuracy.

Additionally, in the liquid crystal panel unit 70, two wedges 77 for positioning are used. The wedges 77 are mounted to the central positions with respect to the vertical dimension of the right and left sides of the first frame plate 72 and the intermediate frame plate 75. It is glued and fixed at this position. When the wedges 77 are not appropriately positioned, an excessive concentration of stress may be generated in the components due to thermal deformation of the first frame plate 75, the intermediate frame plate 75 or the wedges 77. There is also a concern that the wedges 77 may be separated from the first frame plate 72 or the intermediate frame plate 75. However, as described above, the wedges 77 are glued and fixed to the central positions of the right and left sides. As such, the first frame plate 75 and the intermediate frame plate 75 can freely undergo thermal deformation in the vertical direction around these portions. Thus, the degree of constraint of thermal deformation of these frame plates is low, thereby avoiding problems such as an undesirable concentration of stress or separation of the wedges.

Further, as shown in FIG. 7, each of the wedges 77 of this example has two blind holes 77c on the back surface 77b thereof. These blind holes serve as engagement sections for chucking when the wedges 77 are chucked by using a jig. By forming these blind holes 77c, the chucking is facilitated. Thus, the handling of the wedges is facilitated.

In this example, blind holes 77c for engagement at the time of chucking are formed on the back side of the wedges 77. However, the engagement sections for chucking may be formed on other components. For example, engagement sections for chucking, such as blind holes, may be formed on the outer surface of the peripheral wall 72a of the panel frame plate 71.

Figure 8:
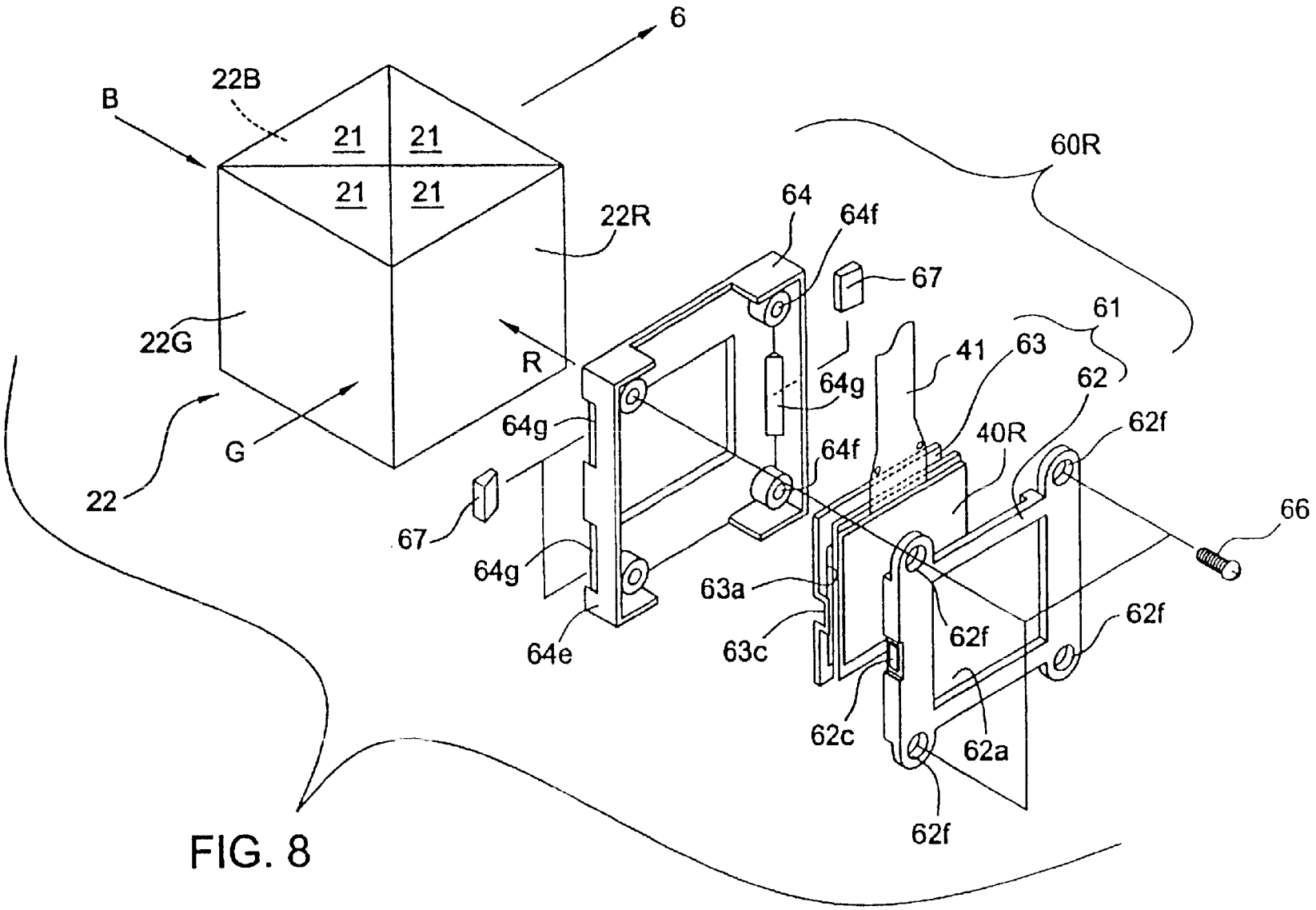
FIG. 8 is an exploded perspective view of another embodiment of the liquid crystal panel unit.

FIG. 8 shows another embodiment of the liquid crystal panel unit. A liquid crystal panel unit 60R shown in this embodiment has a panel frame plate 61 for holding the liquid crystal panel 40R and a fixation frame plate 64 which is glued and fixed to the surface 22R of the prism composite 22. However, there is no portion corresponding to the intermediate frame plate 55 as in the above-described examples. Thus, the panel frame member 61 is directly screwed to the fixation frame plate 64.

FIG. 8 shows that the structure of the panel frame plate 61 is the same as the structure of the panel frame plate 51 of FIG. 5. The panel frame plate 61 is equipped with a first frame plate 62 and a second frame plate 63, with the liquid crystal panel 40R being placed therebetween. To keep these first and second frame plates 62 and 63 engaged, engagement hooks 63c and engagement claws 62c are used. These first and second frame plates 62 and 63 have rectangular openings 62a and 63a for transmitting light.

The fixation frame plate 64, on the other hand, has a holder in the periphery of the rectangular frame portion, i.e., a peripheral wall 64e of a fixed width. The panel frame plate 61 can be fitted into the interior of the peripheral wall 64e. Further, screw holes 64f are formed in the four corners of the inner periphery of the peripheral wall 64e. Screw holes 62f corresponding to the screw holes 64f are formed in the four corners of the first frame plate 62 of the panel frame plate 61. By threadedly engaging screws 66 with these screw holes, the panel frame plate 61 is fastened to the fixation frame plate 64.

Upper and lower wedge guide surfaces 64g are formed on one side surface of the peripheral wall 64e of the fixation frame plate 64. On the other side surface, a wedge guide surface 64g is formed at a central position with respect to the vertical dimension.

The liquid crystal panel unit 60R described above is formed by fixing the panel frame plate 61 to the fixation frame plate 64 by screws 66. After this, the positioning with respect to the surface 22R of the prism composite 22 is accomplished. In this condition, three wedges 67 are inserted into the wedge guide surfaces 64g. The positioning is maintained such that the gap is reduced to zero due to the surface tension of the ultraviolet setting type adhesive already applied to the joint surfaces of the wedges. After the positioning of the wedges 67 has been accomplished, ultraviolet radiation is applied from the exposed end surfaces of the wedges 67 to cure the adhesive for gluing and fixation.

It is also possible to arrange one wedge 67 at the center of each side of the peripheral wall 64e of the fixation frame plate 64. When the fixation frame plate 64 is enlarged, it is possible to minimize the influence of the expansion and contraction as a result of temperature changes, thereby improving reliability.

In the liquid crystal panel unit 60R, the liquid crystal panel 40R is covered with and protected by the frame member 61. Further, the frame member 61, holding the liquid crystal panel 40R, is fastened by screws to the fixation frame plate 64 holding the liquid crystal panel 40R. Thus, the liquid crystal panel 40R is protected, and no external light is allowed to intrude. When replacing the liquid crystal panel with a new one, it is only necessary to detach the screws. There is no concern that the surface of the prism composite will be damaged during the replacing operation.

Since the liquid crystal panel unit 60R of this example includes the panel frame plate 61 and the fixation frame plate 64, it is possible to generally reduce weight and thickness. In particular, when further reducing the size of the liquid crystal panels 60R, 60G and 60B, a problem may be encountered. For example, when the thick liquid crystal panel units are attached to the three surfaces, interference between the liquid crystal panels may occur at the edge portions, thereby making it impossible to reduce the size of the optical system portion including the prism composite 22. In this example, it is possible to form a small-sized and thin liquid crystal panel unit 60 so that a reduction in the size of the optical system portion including the prism composite 22 is easily realized.

Further, a resin material can be used for the fixation frame plate 64 and the first frame plate 62. This reduces weight and enhances the adhesion strength between the prism support plate 33 and the prism unit 20. This makes it possible to provide a product resistant to impacts.

In the liquid crystal panel unit 60R of this example, when replacing the liquid crystal panel 40R, it is only necessary to detach the panel frame plate 61 for replacement. In particular, when mounting a new frame plate 61, when the panel frame plate 61 is directly attached to the fixation frame plate 64, the focusing position is determined. When the components are produced such that the error in the focusing position at the time of this mounting is within the permissible depth of focus, there is no need to perform focus adjustment operation at the time of mounting the panel frame plate.

It is also possible to adopt a system in which, after the replacement, several parts of the outer portion of the first frame plate 62 are glued and fixed to the fixation frame plate without using the screws 66.

Figure 9:
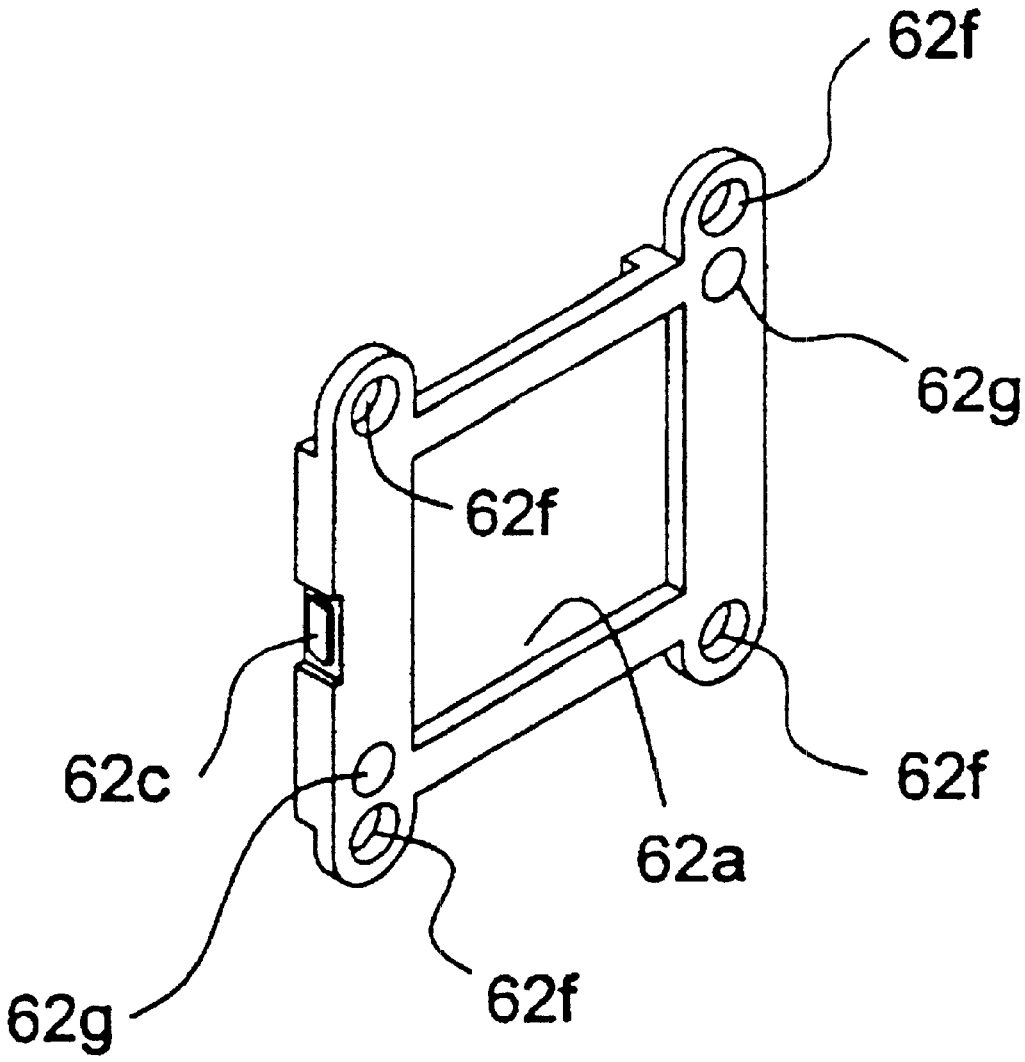
FIG. 9 is a perspective view of a modification of the first fixation frame plate of FIG. 8.

As shown in FIG. 9, blind holes 62g may be provided at two diagonally opposed positions of the four corners of the first fixation frame plate 62. By utilizing the blind holes 62g, the first fixation frame plate 62 is chucked by an adjusting device to perform positioning with respect to the face of the prism composite 22. As described above, after the adhesive for gluing and fixing the first frame plate 62 has been completely cured, the chucking by the adjusting device is canceled. The positioning operation is facilitated by providing such blind holes.

The blind holes 62g for chucking may be in the form of notches provided in the outer periphery of the first frame plate 62. It is also possible to form an engagement section as a chucking section in the outside portion which does not interfere with the side wall 64e of the fixation frame plate 64.

As described above, in the projection type display device of the invention, the light valve can be reliably positioned with respect to the light synthesizing mechanism so that the deviation amount in pixel matching is restrained and the focus adjustment can be correctly conducted. This allows a further level of accuracy to be easily achieved. In addition, the size of the light synthesizing mechanism can be reduced in spite of the construction in which the light valve can be replaced. This contributes to a reduction in the size and weight of the product and makes it possible to obtain a product having a high reliability against disturbances. The mounting sections for the light valve and the intermediate frame plate or the fixation frame plate are arranged on the vertical wall, whereby a vent portion for cooling air is provided.

In addition, the light valve arranged on the light incident surface of the light synthesizing mechanism is held with its periphery being protected by the light valve frame plate. Further, the light valve frame plate holding the light valve is detachably mounted to the fixation frame plate glued and fixed to the light incident surface of the light synthesizing mechanism. Thus, in accordance with the present invention, the periphery of the light valve is covered with the light valve frame plate and is protected so that the light valve cannot be damaged during the handling process. Further, no external light is allowed to intrude, which would cause a malfunction in the light valve. Further, when a malfunction occurs in the light valve, it is possible to replace only the light valve without damaging the surface of the light synthesizing mechanism. This is advantageous from an economical point of view.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A mounting mechanism for mounting a light valve on a side surface of a prism comprising:

a fixation frame plate that is fixed on the side surface of the prism;

a light valve frame plate that holds the light valve, the light valve frame plate being detachably fixed on the fixation frame plate and the light valve frame plate and the fixation frame plate being fixed [to] *onto* a same side of the prism.

2. The mounting mechanism according to claim 1, wherein at least one of the light valve frame plate and the fixation frame plate comprises a peripheral wall covering a periphery of the light valve.

3. The mounting mechanism according to claim 1, further comprising an adjusting member that is glued and fixed between the fixation frame plate and the [side surface of the prism] *light valve frame plate*.

4. The mounting mechanism according to claim 3, wherein the [fixation] *light valve* frame plate comprises an adjusting member guide portion.

5. The mounting mechanism according to claim 3, wherein the adjusting member comprises at least one engagement section utilized when chucking the adjusting member.

6. The mounting mechanism according to claim 3, wherein the adjusting member is provided proximate a center of opposite side portion of the light valve frame plate.

7. The mounting mechanism according to claim 1, wherein the fixation frame plate and the light valve frame plate comprises an engagement section for chucking the plate.

8. The mounting mechanism according to claim 1, wherein the light valve is a liquid crystal panel.

9. A [projection type display device of a type] *projector* which modulates a plurality of color beams through a plurality of light valves, synthesizes the modulated color beams by a prism, and projects a synthesized beam through a projection lens, the [projection type display device] *projector* comprising:

a fixation frame plate that is fixed on a side surface of the prism; *and* a light valve frame plate that holds [a] *the* light valve, the light valve frame plate being detachably fixed [on] *onto* the fixation frame plate and the light valve frame plate and the fixation frame plate being fixed to a same side of the prism.

10. The [projection type display device] *projector* according to claim 9, wherein at least one of the light valve frame plate and the fixation frame plate comprises a peripheral wall covering a periphery of the light valve.

11. The [projection type display device] *projector* according to claim 9, further comprising an adjusting member that is glued and fixed between the fixation frame plate and the [side surface of the prism] *light valve frame plate*.

12. The [projection type display device] *projector* according to claim 11, wherein the [fixation] *light valve* frame plate comprises an adjusting member guide portion.

13. The [projection type display device] *projector* according to claim 11, wherein the adjusting member comprises at least one engagement section utilized when chucking the adjusting member.

14. The [projection type display device] *projector* according to claim 11, wherein the adjusting member is provided proximate a center of opposite side portion of the light valve frame plate.

15. The [projection type display device] *projector* according to claim 9, wherein the fixation frame plate and the light valve frame plate comprises an engagement section for chucking the plate.

16. The [projection type display device] *projector* according to claim 9, wherein the light valve is a liquid crystal panel.

17. A mounting mechanism for mounting a light valve on a side surface of a prism comprising:

a fixation frame plate that is fixed on the side surface of the prism;

a intermediate frame plate that is detachably fixed on the fixation frame;

a light valve frame plate that holds the light valve plate, the light valve frame plate and the fixation frame plate being fixed to a same side of the prism; and a positioning [mechanism positioned proximate to] *member that is glued and fixed between* the intermediate frame plate [for positioning] *and* the light valve *frame plate*.

18. The mounting mechanism according to claim [7] *17*, further comprising a temporal fixing mechanism that temporarily fixes the intermediate frame plate and the light valve frame plate.

19. The mounting mechanism according to claim 18, wherein the temporal fixing mechanism comprises an engagement protrusion formed on one of the intermediate frame plate and the panel frame plate and an engagement hole formed in the other plate.

20. The mounting mechanism according to claim 19, wherein the engagement protrusion inserted into the engagement hole is fixed thereto.

21. The mounting mechanism according to claim 17, wherein the positioning mechanism comprises adjusting [parts] *member* for adjusting the position of the light valve.

22. The mounting mechanism according to claim 21, wherein the light valve frame plate further comprises an adjusting member [guiding mechanism] *guide portion*.

23. The mounting mechanism according to claim 21, wherein the adjusting [parts] *member* comprises at least one engagement section utilized when chucking the adjusting member.

24. The mounting mechanism according to claim 17, wherein the positioning mechanism is located proximate a center of opposite side portions of the light valve frame plate.

25. The [projection type display device] *mounting mechanism* according to claim 17, wherein the light valve is a liquid crystal panel.

26. A [projection type display device of a type] *projector* which separates a beam from a light source into beams of a plurality of colors, modulates each color beam through a *corresponding* light valve in accordance with image information, synthesizes the modulated color beams by light synthesizing *prism*, and projects the synthesized beam onto a projection surface through a projecting mechanism in an enlarged state, the [projection type display device] *projector* comprising:

a fixation frame plate fixed to a light incident surface of [a] *the* light synthesizing prism;

a light valve frame plate for holding the light valve;

a fixing mechanism [for] *that* detachably [fixing] *fixes* the light valve frame plate to the fixation frame plate, the light valve frame plate and the fixation frame plate being fixed to a same side of the prism; and a positioning mechanism positioned proximate to the fixation frame plate for positioning the light valve.

27. A [projection type display device of a type] *projector* which separates a beam from a light source into beams of a plurality of colors, modulates each color beam through a *corresponding* light valve in accordance with image information, synthesizes the modulated color beams by light synthesizing *prism*, and projects the synthesized beam onto a projection surface though a projection mechanism in an enlarged state, the [projection type display device] *projector* comprising:

a fixation frame plate fixed to a light incident surface of [a] *the* light synthesizing prism;

a light valve frame plate for holding the light valve;

an intermediate frame plate placed between the fixation frame plate and the light valve frame plate;

a fixing mechanism [for] *that* detachably [fixing] *fixes* the light valve frame plate and the intermediate frame plate to the fixation frame plate, the light valve frame plate and the fixation frame plate being fixed to a same side of the prism; and a positioning mechanism positioned proximate to the intermediate frame plate for positioning the light valve.

*28. A projector which modulates a plurality of color beams, modulates each color beam through a plurality of light valves, synthesizes the modulated color beams by a prism, and projects a synthesized beam through a projection lens, the projector comprising:*

*a fixation frame plate that is fixed on a side surface of the prism;*

*a light valve frame plate that holds the light valve, the light valve frame plate being detachably fixed onto the fixation frame plate and the light valve frame plate and the fixation frame plate being fixed to a same side of the prism;*

*a power supply;*

*an input/output interface circuit;*

*a video signal processing circuit;*

*a control circuit for driving and controlling the projector; and*

*an outer casing for housing the light valves, the prism, the fixation frame plate, the light valve frame plate, the power supply, the input/output interface circuit, the video signal processing circuit, and the control circuit.*

*29. The projector according to claim 28, wherein at least one of the light valve frame plate and the fixation frame plate comprises a peripheral wall covering a periphery of the light valve.*

*30. The projector according to claim 28, further comprising an adjusting member that is glued and fixed between the fixation frame plate and the light valve frame plate.*

*31. The projector according to claim 30, wherein the light valve frame plate comprises an adjusting member guide portion.*

*32. The projector according to claim 30, wherein the adjusting member comprises at least one engagement section utilized when chucking the adjusting member.*

*33. The projector according to claim 30, wherein the adjusting member is provided proximate a center of opposite side portion of the light valve frame plate.*

*34. The projector according to claim 28, wherein the fixation frame plate and the light valve frame plate comprises an engagement section for chucking the plate.*

*35. The projector according to claim 28, wherein the light valve is a liquid crystal panel.*

*36. A projector which separates a beam from a light source into a plurality of color beams, modulates each color beam through a corresponding light valve in accordance with image information, synthesizes the modulated color beams by light synthesizing prism, and projects the synthesized beam onto a projection surface through a projecting mechanism in an enlarged state, the projector comprising:*

*a fixation frame plate fixed to a light incident surface of the light synthesizing prism;*

*a light valve frame plate for holding the light valve;*

*a fixing mechanism that detachably fixes the light valve frame plate to the fixation frame plate, the light valve frame plate and the fixation frame plate being fixed to a same side of the prism;*

*a positioning mechanism positioned proximate to the intermediate frame plate for positioning the light valve;*

*a power supply;*

*an input/output interface circuit;*

*a video signal processing circuit;*

*a control circuit for driving and controlling the projector; and*

*an outer causing for housing the light source, the light valve, the prism, the fixation frame plate, the light valve frame plate, the fixing mechanism the positioning mechanism, the power supply, the input/output interface circuit, the video signal processing circuit, and the control circuit.*

*37. A projector which separates a beam from a light source into a plurality of color beams, modulates each color beam through a corresponding light valve in accordance with image information, synthesizes the modulated color beams by light synthesizing prism, and projects the synthesized beam onto a projection surface through a projecting mechanism in an enlarged state, the projector comprising:*

*a fixation frame plate fixed to a light incident surface of the light synthesizing prism;*

*a light valve frame plate for holding the light valve;*

*an intermediate frame plate placed between the fixation frame plate and the light valve frame plate;*

*a fixing mechanism that detachably fixes the light valve frame plate to the fixation frame plate, the light valve frame plate and the fixation frame plate being fixed to a same side of the prism;*

*a positioning mechanism positioned proximate to the intermediate frame plate for positioning the light valve;*

*a power supply;*

*an input/output interface circuit;*

*a video signal processing circuit;*

*a control circuit for driving and controlling the projector; and*

*an outer casing for housing the light source, the light valve, the light synthesizing prism, the fixation frame plate, the light valve frame plate, the intermediate frame plate, the fixing mechanism, the positioning mechanism, the power supply, the input/output interface circuit, the video signal processing circuit, and the control circuit.*

* * * * *